United States Patent [19]

Crawford

[11] Patent Number: 5,418,526
[45] Date of Patent: May 23, 1995

[54] SLAVE BUS CONTROLLER CIRCUIT FOR CLASS A MOTOR VEHICLE DATA COMMUNICATIONS

[75] Inventor: Robert D. Crawford, Plymouth, Mich.

[73] Assignee: Ford Motor Company, Dearborn, Mich.

[21] Appl. No.: 276,150

[22] Filed: Jul. 18, 1994

Related U.S. Application Data

[63] Continuation of Ser. No. 878,375, May 4, 1992, abandoned.

[51] Int. Cl.$^6$ ............... H04Q 3/42; H04Q 11/00; H04J 15/00
[52] U.S. Cl. ............... 340/825.06; 340/825.5; 370/85.1; 370/85.2; 370/85.3
[58] Field of Search .............. 340/825.06, 825.5; 370/85.1, 85.2, 85.11, 85.12, 85.13, 85.14, 85.15, 85.3

[56] References Cited

U.S. PATENT DOCUMENTS

| | | | |
|---|---|---|---|
| 3,293,605 | 12/1966 | Moore | 340/150 |
| 3,846,639 | 11/1974 | Ueda et al. | 307/9 |
| 4,063,220 | 12/1977 | Metcalfe et al. | 340/147 |
| 4,293,947 | 10/1981 | Brittain | 370/89 |
| 4,528,662 | 7/1985 | Floyd et al. | 370/92 |
| 4,534,025 | 8/1985 | Floyd | 370/85 |
| 4,623,997 | 11/1986 | Tulpule | 370/85 |
| 4,674,084 | 6/1987 | Suzuki et al. | 370/85 |
| 4,675,865 | 6/1987 | DeVries et al. | 370/85 |
| 4,695,839 | 9/1987 | Barbu et al. | 340/825.06 |
| 4,715,031 | 12/1987 | Crawford et al. | 370/85 |
| 4,739,183 | 4/1988 | Tokura et al. | 307/9 |
| 4,745,596 | 1/1988 | Sato | 370/85 |
| 4,771,282 | 9/1988 | Hamano et al. | 340/825.22 |
| 4,792,950 | 12/1988 | Volk et al. | 371/8 |
| 4,799,218 | 1/1989 | Sakagami et al. | 370/85 |
| 4,816,823 | 3/1989 | Polkinghorne et al. | 340/825.15 |
| 4,947,162 | 8/1990 | Kimura | 340/825.08 |
| 4,961,189 | 10/1990 | Cukier et al. | 370/112 |
| 5,168,272 | 12/1992 | Akashi et al. | 370/85.15 |

FOREIGN PATENT DOCUMENTS 0429647  6/1991  European Pat. Off. .
0482957  4/1992  European Pat. Off. .
4096505  3/1992  Japan .

OTHER PUBLICATIONS

Uramoto & Inomata, "Development of Multiplex Wiring Systems in Automobiles", Feb. 1988, pp. 49–54, by SAE (#880590).
SAE, "Class B Data Communication Network Interface J1850", Nov. 1988 (see pp. 20.176–20.180).
Inoue et al, 8087 IEEE Transactions on Consumer Electronics, *A Home Automation System*, vol. CE-31, No. 3, Aug. 1985, pp. 516–525, New York.
Reynolds et al, Oceans '88, *The Zeno Alliance Network: A Dual-Loop Fiber Optic Instrumentation Network for Ships*, Nov. 1988, Baltimore, Maryland, pp. 1560–1568.
Zandra, "Datenkommunikation in Kraftfahrzeugen," *Elektrotechnik und Informationstechnik*, vol. 107, No. 1, 1990, pp. 30–33.

*Primary Examiner*—Donald J. Yusko
*Assistant Examiner*—David Jung
*Attorney, Agent, or Firm*—Richard D. Dixon; Roger L. May

[57] ABSTRACT

A Class A node comprising a slave bus controller circuit (SBCC) operates as a remote input/output device for performing Class A communications for a master Class B node over an interconnecting SAE J1850 or similar network. The SBCC receives messages from one or more Class B nodes to receive output data which appears at one or more output ports of the SBCC. Output data may be directly provided or may be combined with mask data such that only mask selected bits of the output data are passed to the one or more output ports of the SBCC. Input data directly connected to one or more input ports of the SBCC are transmitted back to a master node as an in-message response of the network. The SBCC provides inexpensive Class A communications using the SAE J1850 protocol which is primarily intended for Class B communications. The SBCC is inexpensive because of its simplified circuitry, its ability to operate without a controlling processor and, in some embodiments, the implementation of its master clock as a RC oscillator which does not directly determine bit timing for the SBCC but is used to measure the bit timing of the master node from which it is receiving messages.

11 Claims, 4 Drawing Sheets

5,418,526

SLAVE BUS CONTROLLER CIRCUIT FOR CLASS A MOTOR VEHICLE DATA COMMUNICATIONS

This is a continuation of application Ser. No. 07/878,375, filed May 4, 1992, now abandoned.

BACKGROUND OF THE INVENTION

The present invention relates generally to multiplex data communications systems and, more particularly, to a slave circuit for use on a motor vehicle multiplex communications bus to provide remote data input and output for one or more standard nodes connected to the bus.

The use of multiplex wiring systems in motor vehicles have been known for some time to reduce the large number of wires which are used within vehicles. In addition, such multiplex wiring systems benefit the design, assembly and diagnostics of motor vehicles. To promote uniformity and facilitate use of multiplex wiring systems within motor vehicles, the Society of Automotive Engineers (SAE) has adopted a protocol known as the J1850 protocol.

The J1850 protocol is primarily concerned with bus signals within a speed range of from approximately 1 to 100 kilobits-per-second which signals are commonly referred to as Class B signals. Class B signals are required for example for information sharing among systems concerned with control, instrumentation and power train components of a motor vehicle. The J1850 protocol must also be capable of handling bus signals within a speed range of from 10 bits-per-second to 1 kilobits-per-second which signals are commonly referred to as Class A signals. Simple body control applications such as lights including turning and braking indications, dashboard displays and power options such as seat motors and trunk opener solenoids are typical of Class A signals. While Class B signals represent more critical information, Class A signals are important from a wire reduction standpoint because Class A wiring typically accounts for 60 to 65% of the total wiring within a motor vehicle.

Since network nodes capable of handling Class B signals are relatively expensive when compared to devices which are capable of handling the much slower Class A signals, it is undesirable to use Class B nodes for performing Class A operations in most situations. To economically permit the performance of Class A operations from Class B nodes, there is a need for a low cost Class A interface designed for simple input and output functions on a Class B network using the J1850 protocol. Preferably, the interface would be a stand-alone unit which would operate with one or more nodes connected to a Class B network.

SUMMARY OF THE INVENTION

This need is met by the method and apparatus of the present invention wherein a Class A node comprising a slave bus controller circuit (SBCC) operates as a remote input/output device for performing Class A communications for a master Class B node over an interconnecting SAE J1850 network. The SBCC receives messages from one or more Class B nodes to receive output data which appears at one or more output ports of the SBCC. Output data may be directly provided or may be combined with mask data such that only mask selected bits of the output data are passed to the one or more output ports of the SBCC. Input data directly connected to one or more input ports of the SBCC is transmitted back to a master node as the in-message response of the network using the SAE J1850 protocol.

The SBCC provides inexpensive Class A communications using the SAE J1850 protocol which is primarily intended for Class B communications. The SBCC is inexpensive because of its simplified circuitry, its ability to operate without a controlling processor and, in some embodiments, its master clock is implemented as a RC oscillator which does not directly determine bit timing for the SBCC but is used to measure the bit timing of the master node from which it is receiving messages. Start of message (SOM) signals on the network are identified using currently available data representative of the approximate relationship between the RC oscillator and the master node bit timing. Each start of message signal (SOM) is used to accumulate a count of RC oscillator pulses which is then used to more accurately define the relationship between the RC oscillator and the master node bit timing.

It is a feature of the present invention to provide a method and apparatus for economically performing Class A operations in a network which is primarily designed for Class B operations; to provide a method and apparatus for economically performing Class A operations in a network which is primarily designed for Class B operations utilizing an in-message response feature of the SAE J1850 protocol using a Class A node having no internal processor; and, to provide a method and apparatus for economically performing Class A operations in a network which is primarily designed for Class B operations wherein a Class A node utilizes an inexpensive RC oscillator as a master clock.

Other features and advantages of the invention will be apparent from the following description, the accompanying drawings and the appended claims.

DETAILED DESCRIPTION OF THE INVENTION

Figure 1:
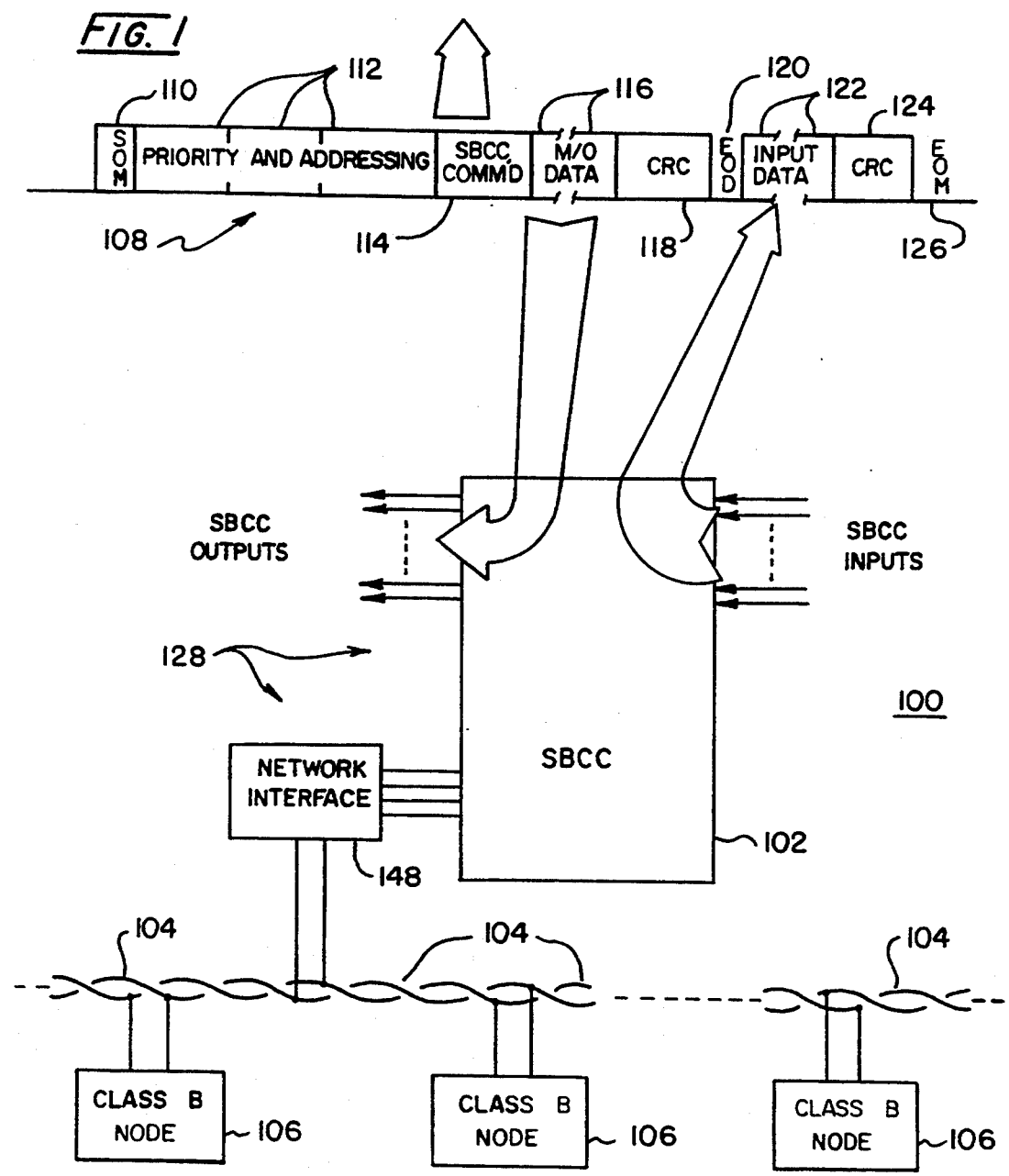
FIG. 1 is a schematic block diagram of a multiplex data communications system including a slave bus controller circuit (SBCC) in accordance with the present invention which is particularly applicable for use in a motor vehicle.

A multiplex data communications system 100 illustrating a slave bus controller circuit (SBCC) 102 operable in accordance with the present invention is shown in schematic block diagram form in FIG. 1. The multiplex data communications system 100 is particularly applicable for but not limited to use in motor vehicles and will be described herein with reference to this application.

The system 100 includes a network 104 or data bus made up of a twisted wire pair in the illustrated embodiment; however, as will be apparent to those skilled in the art, a single wire or other transmission mediums can be used to define the data bus of the present invention. A number of Class B nodes 106 are connected to the network 104 for transmitting Class B and Class A information over the network 104 for monitoring and controlling systems of a motor vehicle incorporating the system 100.

The SBCC 102, which is preferably formed as an integrated circuit, is a stand-alone device which provides remote input and/or output capability for one or more of the Class B nodes 106 within the system 100. Accordingly, it operates as an I/O expander for one or more of the nodes 106 at a location which is remote from the node or nodes. The SBCC 102 of the present invention is very inexpensive because it includes only simple logic functions, does not require a microprocessor for its operation and, for some embodiments, does not require a high precision crystal or ceramic resonator clock for a timing reference. The input and output functions of the SBCC 102 are under the control of a "master" node which, in the illustrated embodiment, comprises one of the Class B nodes 106 on the network 104. Accordingly, the SBCC 102 is advantageously employed to assist the Class B nodes 106 in performing Class A signalling.

Operation of the SBCC 102 of the present invention relies upon the in-message response feature of the Society of Automotive Engineers (SAE) J1850 protocol which will be described with reference to the message 108 format shown in FIG. 1. Each J1850 message transmitted over the network 104 begins with a distinct start of message (SOM) signal 110 which comprises two bits with each bit being made up of three subbits. The start of message (SOM) signal comprises four high or dominate subbits followed by two low or passive subbits.

Next within the message 108 is priority and addressing data 112 which identifies the SBCC for which the message 108 is intended and defines the priority level of the message. Arbitration for the bus is performed on a bit-by-bit basis with zero dominant coding in accordance with the specifications of the J1850 protocol.

Next within the message 108 is a SBCC command 114. As shown in FIG. 1, two SBCC commands are currently defined: 1000XXXX is a direct output command; and, 1001XXXX is a masked output command. For the direct output command, output data are transmitted to the identified SBCC and are directly used by the SBCC; and, for the masked output command, both mask data and output data are transmitted to the identified SBCC with the mask data defining which of the output data are to be used by the SBCC.

Next within the message 108 is the mask and/or output data 116 which was referred to with reference to the two currently defined SBCC commands. For the masked output command, the mask and output data can be intermixed within a given data byte or separate mask and output data bytes can be provided.

The mask and/or output data 116 is followed by a cyclic redundancy code (CRC) check byte 118. The CRC check byte 118 is generated in accordance with well known techniques and, in the preferred embodiment, uses the CRC division polynomial $X^8+X^4+X^3+X^2+1$ as defined by the SAE J1850 protocol. The CRC check byte 118 is calculated over the priority and addressing data 112, the SBCC command 114, and all mask and/or output data 116 in the preferred embodiment.

Next within the message 116 is an end of data (EOD) 120 signal. The EOD 120 comprises a single bit made up of three low or passive subbits in the preferred embodiment of the present invention.

Following the EOD 120 signal is input data 122 which forms the in-message response of the J1850 protocol. For the present invention, the input data 122 represents input signals which are received by the SBCC 102 and are to be transmitted to a master node which originated the message 108 for the identified SBCC.

The input data 122 is followed by a return cyclic redundancy code (CRC) check byte 124. The return CRC check byte 124 is generated in accordance with well known techniques and, in the preferred embodiment, uses the CRC division polynomial $X^8+X^4+X^3+X^2+1$ as defined by the SAE J1850 protocol. The return CRC check byte 124 is calculated over all of the input data 122.

Each J1850 message transmitted over the network 104 is ended by a distinct end of message (EOM) signal 126 which comprises two bits with each bit being made up of three subbits. The end of message (EOM) signal comprises six low or passive subbits.

Thus, as shown in FIG. 1, a Class B node is able to initiate a message which includes mask and/or output data to an identified SBCC and receive back input data from the identified SBCC within the same message. Since mask data can be provided in the message, more than one Class B node may control a given SBCC without interfering with one another. By always including mask data within messages, a Class B node can ensure that only the output data selected by the mask data is effected by the output data transmitted in a message. One or more Class B nodes can control the remaining output data and similarly limit their effects upon the output data of a given SBCC by including appropriate mask data. In this way, different class B nodes can control different outputs on the same SBCC.

Figure 2:
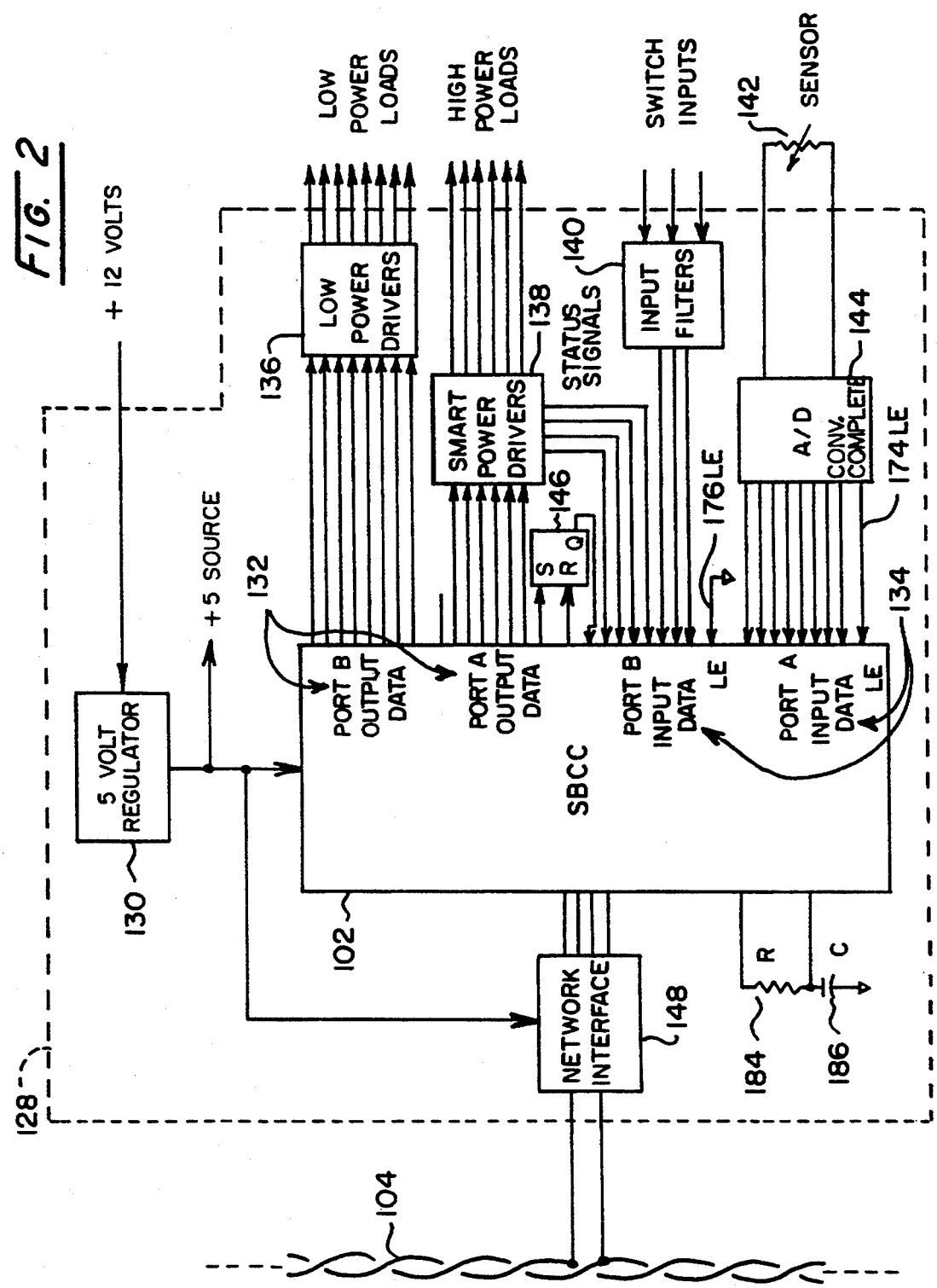
FIG. 2 is a schematic block diagram of a Class A node including the SBCC of FIG. 1.

A SBCC together with associated components form a Class A node 128 as more fully shown in FIG. 2. Twelve volt power from a battery of a motor vehicle including the system 100 is provided to a voltage regulator 130. The voltage regulator 130 provides power of an appropriate voltage level for the SBCC 102, five volts as illustrated in FIG. 2. While the voltage regulator 130 is shown separate and apart from the SBCC 102, it should be apparent that it could be provided on the same integrated circuit if desired. The SBCC 102 of FIG. 2 is illustrated as having two output ports 132, output ports A and B, each having eight bits, and two input ports 134, input ports A and B, each having eight bits, although any mix of input and output ports having up to eight bits each can be used on a SBCC as long as the total signal bit limits for messages using the SAE J1850 protocol is not exceeded.

The conductors of output port A are shown as being connected to low power drivers 136 which are used to drive low power outputs such as dashboard displays, dome lights and the like. The conductors of output port B are shown as being connected to "smart power drivers" 138 which may be used to drive high power loads such as headlights, accessory motors and the like. The smart power drivers 138 can provide status signals regarding the driven high power loads with the status signals being received as input data by the SBCC 102 as shown in FIG. 2. The smart power drivers 138 are commercially available, form no part of the present invention and, accordingly, will not be further described herein.

Additional input data received by the input ports of the SBCC can come from switches, signals from which are preferably filtered by input filters 140. Sensors can also be monitored by the SBCC. For example, a potentiometer 142 is shown as generating a signal which is converted from analog form to digital form by an analog-to-digital (A/D) converter 144 and passed to data inputs of the SBCC 102. As shown, the digital output of the A/D converter 144 is passed to the entire input port B; however, it is noted that such signals could be passed to only a portion of an input port or to more than one input port dependent upon signal amplitudes and resolution requirements. Further, a large variety of sensors can be used in conjunction with a SBCC as will be apparent to those skilled in the art.

To assure a master Class B node that a message has been received by a Class A node, such as the node 128, a signal on one of the conductors of an output port may be looped back to one of the conductors of an input port. In the illustrated embodiment, a flip-flop circuit 146 is provided as shown in FIG. 2 such that the flip-flop circuit 146 is set by a signal on the output port B, the resulting high or logical 1 signal being included in the input data or in-message response of the message which set the flip-flop circuit 146. The flip-flop circuit 146 is then cleared during transmission of the in-message response in preparation for the next message sent to the Class A node. Since the output ports are updated by output data contained within a message prior to formation of the input data for transmission to the network 104, a flip-flop circuit or other alternates can be used for looping one of the outputs to one of the inputs as will be apparent to those skilled in the art.

The structure and operation of the SBCC 102 will now be described in more detail with reference to FIG. 3. The SBCC 102 is coupled to the network 104 through a network interface circuit 148 which comprises an analog receiver 150 and transmitter driver 152 in the illustrated embodiment. As with the voltage regulator 130, the analog receiver 150 and transmitter driver 152 are shown as being separate and apart from the SBCC 102; however, they too could be included in the same integrated circuit as the SBCC 102. The receiver 150 is connected to a bit decoder circuit 154 and a bit timer circuit 156 by one or three conductors. Three conductors are used for fault tolerant data reception in accordance with the teachings of U.S. Pat. No. 4,792,950 which is incorporated herein by reference. Otherwise, only one conductor need be used. Those interested in an understanding of data reception from the bus and fault tolerant data reception, which forms no part of the present invention, are referred to the referenced patent.

The bit decoder circuit 154 decodes the pulse width modulated (PWM) message stream from the analog receiver 150 into non-return-to-zero (NRZ) bit data comprising a start of message (SOM) signal, a node or SBCC address, a node or SBCC command, mask data and/or output data for an SBCC, a CRC check byte and an end of data (EOD) signal. The NRZ bit data is passed to a message qualifier circuit 158 which examines the data to determine whether the SBCC 102 is addressed in the received message, and if so, which of the two currently defined SBCC commands is contained within the message.

The bit decoder circuit 154 also detects an idle data bus or idle network 104 whenever two or more idle bit periods are detected on the network 104. When an idle data bus is detected, the bit decoder circuit 154 generates an idle bus signal on a conductor 159 which is connected to the bit timer circuit 156. The idle bus signal is high or valid after detection of an idle data bus and remains so until a start of message (SOM) signal is detected by the bit decoder 154 at which time the idle bus signal goes low or invalid. Operation of the bit timer circuit 156 utilizes the idle bus signal and will be described hereinafter.

If the direct output command, 1000XXXX is identified by the message qualifier circuit 158, a steering logic circuit 160 is set up to pass the output data contained within the message directly to inputs of an output register or registers comprising two output registers 162, 164 in the illustrated embodiment.

If the masked output command, 1001XXXX is identified by the message qualifier circuit 158, the steering logic circuit 160 is set up to pass the mask data contained within the message to a mask register or registers comprising two mask registers 166, 168 in the illustrated embodiment. The two mask registers 166, 168 correspond to the output registers 162, 164, respectively, and control the entry of output data contained within the message into the output registers 162, 164.

The message qualifier circuit 158 includes a CRC check circuit which verifies the validity of the received message and generates a valid message signal which is passed to the output registers 162, 164, an input control circuit 170, and a CRC generator circuit 172 via a conductor 173. The valid message signal from the message qualifier circuit 158 loads the output data on the inputs of the output registers 162, 164 into the output registers 162, 164 for the direct output command, 1000XXXX. For the masked output command, 1001XXXX, the valid message signal from the message qualifier circuit 158 loads the output data on inputs of the output registers 162, 164 which are enabled by the mask data which was loaded into the mask registers 166, 168. In any event, the data then contained within the output registers 162, 164 appears at the output data ports of the SBCC 102. The output data on the data output ports 132 is latched between messages from a master node.

Input data on the input ports 134 are connected to inputs for the input registers 174, 176. The input registers 174, 176 include data latches which include latch enable inputs 174LE and 176LE, respectively, for receiving and holding input data from the data inputs ports 134. A transition of the signal on the latch enable inputs 174LE, 176LE from a high logic level to a low logic level captures and holds the data present on the input ports.

As shown in the illustrated embodiment of the invention, a separate latch enable input is provided for each input register provided in a SBCC. Use of the latch enable inputs is illustrated by the A/D converter 144 shown in FIG. 2 which activates the latch enable input 174LE for each complete data conversion performed. If latched data is not needed, the latch enable input or inputs, such as the latch enable input 176LE, may be tied low.

The input registers 174, 176 also include parallel-to-serial shift registers which are connected in tandem to shift out NRZ data as the in-message data or input data 122 of the message 108. The NRZ data is passed to the CRC generator circuit 172 and to steering logic 178. The CRC generator circuit 172 calculates the return CRC check byte 124 over all of the input data 122 which is shifted from the input registers 174, 176. The steering logic passes the NRZ data to a pulse width modulator (PWM) 180 signal generator as the return CRC check byte 124 is being generated and then passes the return CRC check byte 124 to the pulse width modulator (PWM) 180 as NRZ data for appending to the input data 122 in the message 108. The resulting PWM response from the pulse width modulator (PWM) 180 is passed to the transmitter driver 152 which drives the network 104 to provide the in-message response or input data and return CRC check byte to the master node which originally generated the message 108.

Figure 3:
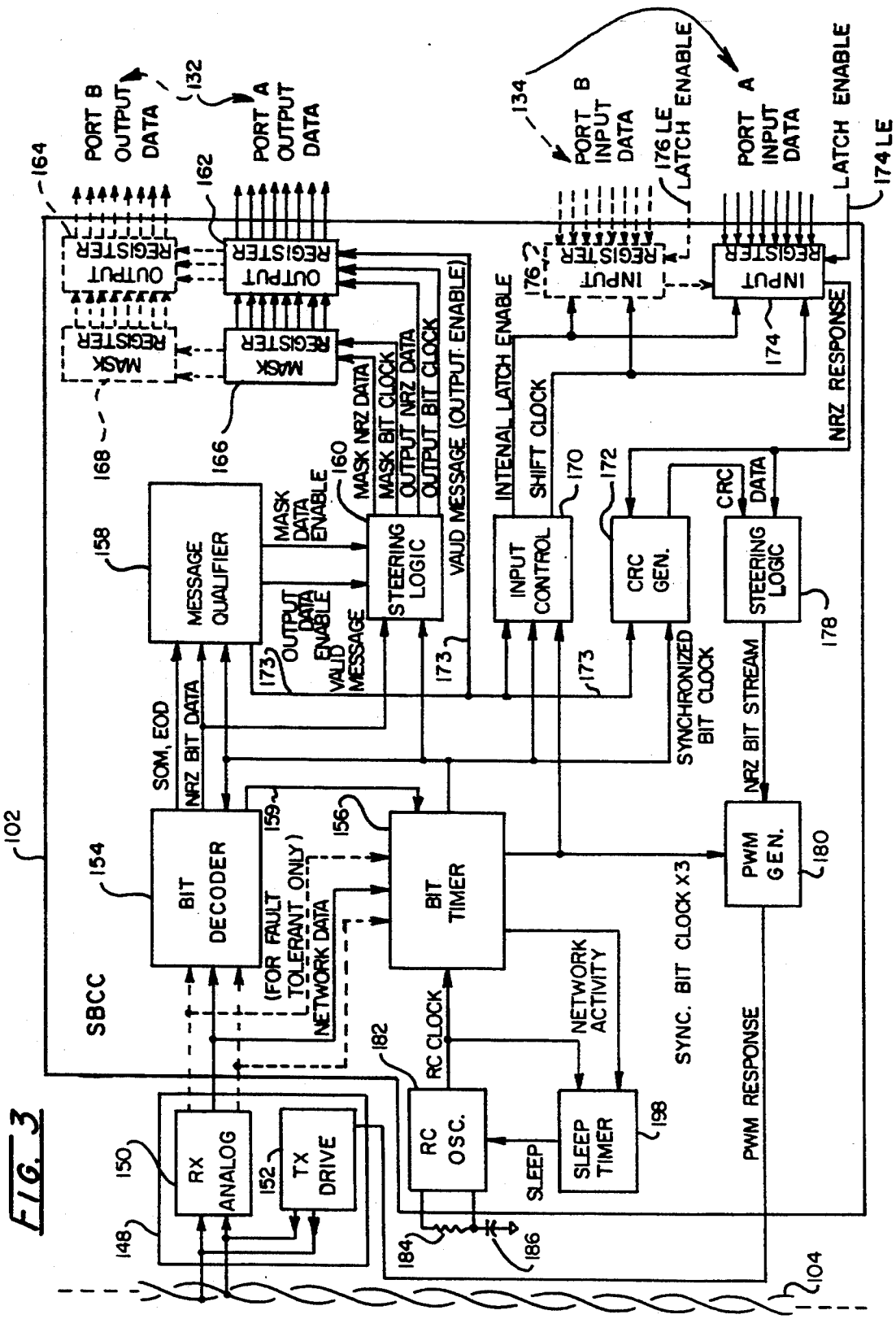
FIG. 3 is a schematic block diagram of the SBCC of FIGS. 1 and 2.

The SBCC 102 of the illustrated embodiment of FIG. 3 uses an inexpensive RC oscillator 182 for its master clock with the oscillation frequency determining resistor (R) 184 and capacitor (C) 186 being externally provided for the preferred integrated circuit version of the SBCC 102. The RC oscillator 182 oscillates at a frequency which is an approximate multiple of the bit rate for the network 104. For example, the frequency of the oscillator 182 may be approximately 48 times the bit rate for the network 104. However, the oscillator 184 does not determine the bit timing for the SBCC 102 but is used to measure the bit timing of the start of message (SOM) of the master node which is sending a message to the SBCC 102. The measured bit timing value is used both for decoding received messages and for setting the timing for the return of the input data 122 and associated return CRC check byte 124. Accordingly, the timing accuracy of the SBCC 102 is determined by and coordinated with each master node with which it operates.

Figure 4:
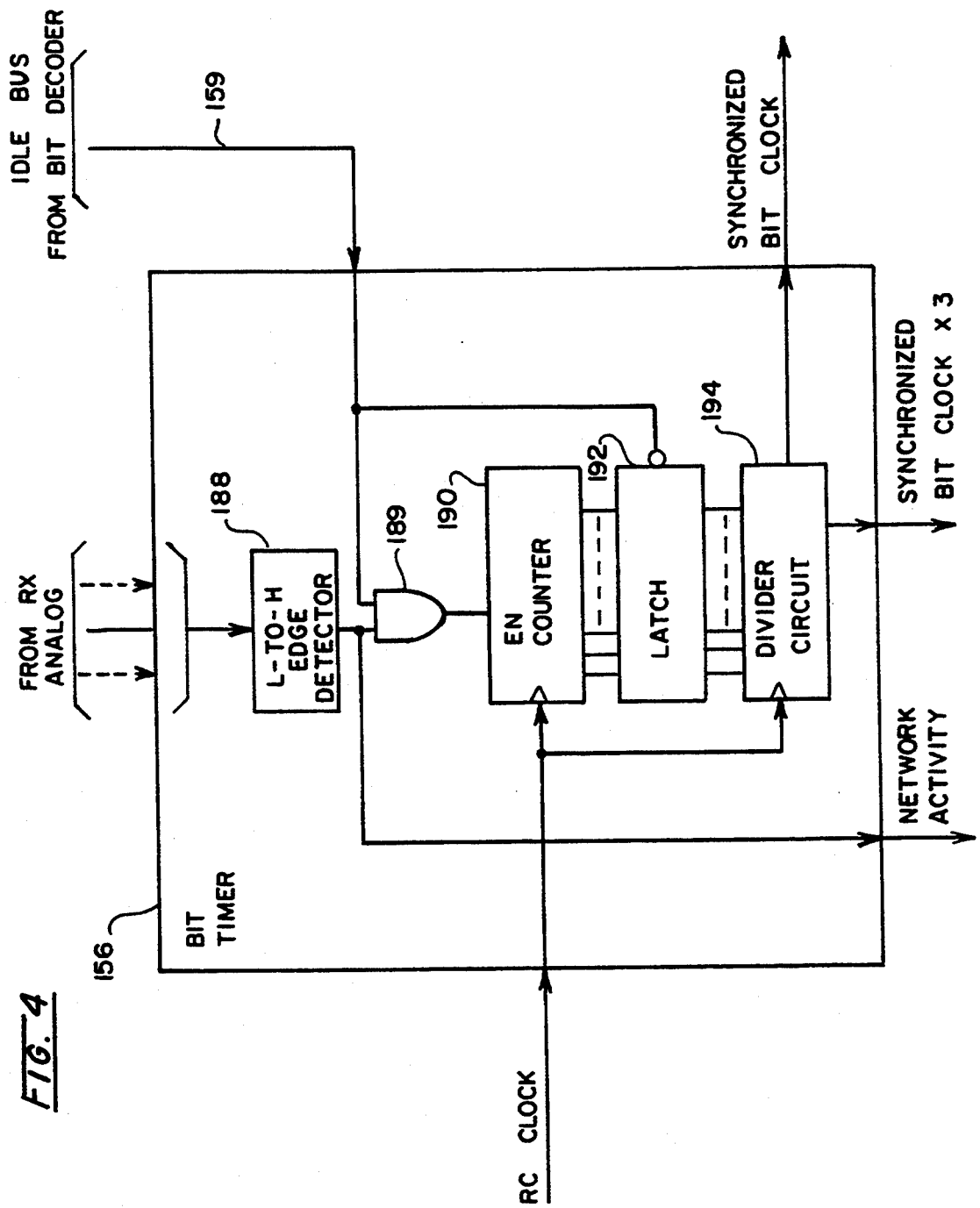
FIG. 4 is a schematic block diagram of a bit timer of the SBCC of FIG. 3.

The bit timer circuit 156 is shown in schematic block diagram form in FIG. 4. A low-to-high edge detector 188 receives signals from the analog receiver 150 and generates an output signal each time a low-to-high bus signal transition is detected. The output signal from the low-to-high edge detector 188 is passed to an AND gate 189 which also receives the idle bus signal on the conductor 159. When the AND gate 189 is enabled by a high or valid idle bus signal from the bit decoder 154 and receives a signal from the low-to-high edge detector 188, the AND gate 189 clears and enables a counter circuit 190 which counts pulses from the RC oscillator 182.

When the bus idle signal from the bit decoder 154 goes low or invalid upon detection of a start of message (SOM) signal, the counter circuit 190 is disabled and the contents of the counter circuit 190 are latched into a latch circuit 192. A divider circuit 194 divides a count of pulses from the RC oscillator 182 by a clock divisor contained within the latch circuit 192 to generate a synchronized bit clock and a synchronized bit clock ×3 which are distributed within the SBCC 102 as shown in FIG. 3.

The clock divisor contained within the latch circuit 192 is set to equal a divisor for an nominal master node clock frequency and a nominal RC oscillator frequency when the system 100 is initially powered up. Since the master node clocks are very precise and the RC oscillator is within ±10%, a window is established to identify a SOM signal. With the counter circuit 190 counting pulses from the RC oscillator 182 during the SOM signal and the resulting count being latched into the latch circuit 192 upon identification of the SOM signal, this SOM count is then used as the clock divisor such that the clock divisor accurately reflects the relationship between pulses from the RC oscillator 182 and the bit timing of a master node which is sending a message including the SOM. Accordingly, the bit timer 156 is synchronized with each master node from which it receives messages. Additional synchronization can be performed during a received message substantially as described if necessary or desired by using master data bit timing in addition to SOM timing.

To conserve power, the SBCC 102 includes automatic sleep/wakeup circuitry including a sleep timer 198. The sleep timer 198 includes a time-out counter which counts pulses from the RC oscillator 182 with the time-out counter being reset by a network activity signal received from the bit timer 156. If there is no network activity for the time period defined by the time-out counter of the sleep timer 198, the RC oscillator 182 is turned off such that the SBCC will "sleep" until activity is once again encountered on the network 104. The RC oscillator 182 restarts with sufficient speed relative to the bit timing of the master nodes or Class B nodes 106 that the count determined in the bit timer 156 previously described is not effected.

Having thus described the present invention in detail and by reference to preferred embodiments thereof, it will be apparent that modifications and variations are possible without departing from the scope of the invention defined in the appended claims.

What is claimed is:

1. A remote input/output signal slave circuit for a master control circuit operable on a multiplex network for a motor vehicle, said slave circuit being positioned at a remote location relative to said master control circuit for controlling and monitoring operations at said remorse location in response to control messages from said master control circuit and comprising:

receiver means connected to said network for receiving said control messages from said master control circuit;

clock means for generating clock signals for operating slave circuit;

message decoder means connected to said receiver means for decoding said control messages;

output register means for receiving output data contained within said control messages from said message decoder means, said output data comprising a plurality of output data bit positions and being used for controlling operations at said remote location, said output register means comprising mask register means connected to said message decoder means, said control messages including mask data identifying output data bit positions to be modified by said output data contained within said control messages such that said slave circuit can be controlled by two or more master control circuits with mask data transmitted by each master control circuit ensuring independent control of output data corresponding to each of said two or more master control circuits;

input register means for receiving input data to be transmitted to said master control circuit via said network;

data encoder means connected to said input register means for encoding said input data for transmission onto said network; and transmitter means connected between said data encoder means and said network for transmitting encoded input data for said master control circuit onto said network as an in-message response of said control master such that said input data is transmitted to said master control circuit without said slave circuit having to gain control over said network.

2. A remote input/output signal slave circuit for a master control circuit operable on a multiplex network for a motor vehicle, said slave circuit being positioned at a remote location relative to said master control circuit for controlling and monitoring operations at said remote location in response to control messages from said master control circuit and comprising:

receiver means connected to said network for receiving said control messages from said master control circuit;

clock means for generating clock signals for operating said slave circuit, said clock means comprising a local oscillator and a bit timer circuit for synchronizing and calibrating said local oscillator to timing defined by said control message received from said master control circuit, said bit timer circuit comprising a counter circuit, a logic circuit which clears and enables said counter circuit to count pulses which are a multiple of a network clock during a start of message signal received by said slave circuit, a divider circuit for dividing resulting counts by a defined clock divisor to generate synchronized bit clock signals for said slave circuit;

message decoder means connected to said receiver means for decoding said control messages;

output register means for receiving output data contained within said control messages from said message decoder means, said output data comprising a plurality of output data bit positions and being used for controlling operations at said remote location;

input register means for receiving input data to be transmitted to said master control circuit via said network;

data encoder means connected to said input register means for encoding said input data for transmission onto said network: and transmitter means connected between said data encoder means and said network for transmitting encoded input data for said master control circuit onto said network as an in-message response of said control message such that said input data is transmitted to said master control circuit without said slave circuit having to gain control over said network.

3. A remote input/output signal slave circuit as claimed in claim 2 further comprising sleep timer means for disabling said local oscillator after a defined idle network time period and restarting said local oscillator upon network activity.

4. A remote input/output signal slave circuit as claimed in claim 3 wherein said local oscillator is an RC oscillator.

5. A remote input/output signal slave circuit for a master control circuit operable on a multiplex network for a motor vehicle, said slave circuit being positioned at a remote location relative to said master control circuit for controlling and monitoring operations at said remote location in response to control messages from said master control circuit and comprising receiver means connected to said network for receiving said control messages from said master control circuit;

clock means for generating clock signals for operating said slave circuit;

message decoder means connected to said receiver means for decoding said control message;

output register means for receiving output data contained within said control message from said message decoder means, said output data comprising a plurality of output data bit positions and being used for controlling operations at said remote location;

input register means for receiving input data to be transmitted to said master control circuit via said network;

data encoder means connected to said input register means for encoding said input data for transmission onto said network;

transmitter means connected between said data encoder means and said network for transmitting encoded input data for said master control circuit onto said network as an in-message response of said control message such that said input data is transmitted to said master control circuit without said slave circuit having to gain control over said network; and input control means for latching input signals into said input register means during generation and transmission of said in-message response of said control message such that invalid asynchronous input signal changes are prevented, said input control means latching said input signals a defined time after receipt of output data in said output register means such that status information resulting from said output data and output data receipt confirmation is returned in said in-message response of said control message.

6. A method of interfacing equipment to be controlled and monitored by two or more master control circuits via a multiplex wiring network in a motor vehicle, said method comprising the steps of:

receiving control messages from said two or more master control circuits via said network, said messages each including output data for devices to be controlled and mask data identifying output data bit positions to be modified by said output data contained within said control message;

decoding said control message;

loading said output data into an output register;

loading said mask data into a mask register associated with said output register;

outputing said output data to output data bit positions identified by said mask data;

receiving input data to be transmitted to said master control circuit via said network;

encoding said input data for transmission to said master control circuit via said network; and transmitting encoded input data to said master control circuit via said network as an in-message response of said control message.

7. A method of interfacing equipment to be controlled and monitored by two or more master control circuits via a multiplex wiring network in a motor vehicle as claimed in claim 6 further comprising the steps of:

synchronizing and calibrating a local oscillator of said equipment to timing defined by said control messages received from said two or more master control circuits;

clearing a counter circuit;

enabling said counter circuit to count pulses which are a multiple of a network clock during start of message signals contained within said control messages;

dividing counts accumulated in said counter circuit during said start of message signals by a defined clock divisor to generate synchronized and calibrated clock signals for said equipment.

8. A remote input/output signal slave circuit for a master control circuit operable on a multiplex network for a motor vehicle, said slave circuit being positioned at a remote location relative to said master control circuit for controlling and monitoring operations at said remote location in response to control messages from said master control circuit and comprising:

receiver means connected to said network for receiving said control messages from said master control circuit;

clock means for generating clock signals for operating said slave circuit;

message decoder means connected to said receiver means for decoding said control message;

output register means for receiving output data contained within said control message from said message decoder means, said output data comprising a plurality of output data bit positions and being used for controlling operations at said remote location;

input register means for receiving input data to be transmitted to said master control circuit via said network;

data encoder means connected to said input register means for encoding said input data for transmission onto said network;

transmitter means connected between said data encoder means and said network for transmitting encoded input data for said master control circuit onto said network as an in-message response of said control message such that said input data is transmitted to said master control circuit without said slave circuit having to gain control over said network; and input control means for latching input signals into said input register means during generation and transmission of said in-message response of said control message such that invalid asynchronous input signal changes are prevented, said input control means latching said input signals a defined time after receipt of output data in said output register means and further comprising a looping circuit connected between said output register means and said input register means for looping at least one of said output data bit positions from said output register means to said input register means such that status information resulting from said output data and output data receipt confirmation is returned in said in-message response of said control message.

9. A remote input/output signal slave circuit as claimed in claim 8 wherein said looping circuit comprises a flip-flop circuit.

10. A method of interfacing equipment to be controlled and monitored by a master control circuit via a multiplex wiring network in a motor vehicle, said method comprising the steps of:

receiving a control message for said master control circuit via said network, said message including output data for devices to be controlled;

decoding said control message;

loading said output data into output register means;

receiving input data to be transmitted to said master control circuit via said network;

encoding said input data for transmission to said master control circuit via said network:

transmitting encoded input data to said master control circuit via said network as an in-message response of said control message; and looping at least one of said output data from said output register means to be received as input data to be transmitted to said master control circuit via said network such that status information resulting from said output data and output data receipt confirmation is returned in said in-message response of said control message.

11. A method of interfacing equipment to be controlled and monitored by a master control circuit via a multiplex wiring network in a motor vehicle as claimed in claim 10 wherein said step of looping at least one of said output data from said output register means to be received as input data to be transmitted to said master control circuit via said network comprises the step of connecting a flip-flop circuit between said output register means and input register means which receives said input data.

* * * * *